United States Patent [19]
Eckerdt et al.

[11] 3,711,905
[45] Jan. 23, 1973

[54] SLIDE HOLDER

[75] Inventors: George H. Eckerdt; William P. Ewald, both of Rochester, N.Y.

[73] Assignee: Eastman Kodak Company, Rochester, N.Y.

[22] Filed: Dec. 7, 1971

[21] Appl. No.: 205,678

[52] U.S. Cl. ............24/263 PC, 206/62 R, 294/87 R
[51] Int. Cl. .......A44b 21/00, B65d 85/46, B66c 1/10
[58] Field of Search ....206/62 R; 294/87 R; 353/103; 24/81 FC, 263 PC, 263 PJ, 263 SB

[56] References Cited

UNITED STATES PATENTS

| | | | |
|---|---|---|---|
| 1,268,919 | 6/1918 | Bleile | 294/87 R |
| 2,487,040 | 11/1949 | Bilodeau | 294/87 R |
| 3,552,846 | 1/1971 | Hansen | 353/103 |

*Primary Examiner*—Donald A. Griffin
*Attorney*—W. H. J. Kline et al.

[57] ABSTRACT

A slide holder for storing and/or transporting a stack of slides is generally box shaped with one open side. Two opposed sides have resilient pads mounted thereon to form spaced slide gripping members positionable on opposite sides of an assembled group of slides. The gripping members are movable toward and away from each other for selectively gripping and releasing the slides. The top wall connecting the gripping members forms snap action, overcenter spring means having a first stable condition for simultaneously urging the members toward each other to the slides and a second stable condition for simultaneously urging the members away from each other to release the slides. The slide holder may be used to transport a stack of slides from a storage container to the magazine of a slide projector.

12 Claims, 4 Drawing Figures

PATENTED JAN 23 1973 3,711,905

GEORGE H. ECKERDT
WILLIAM P. EWALD
INVENTORS

BY Milton S. Sales
H. H. J. Kline
ATTORNEYS

PATENTED JAN 23 1973 3,711,905

GEORGE H. ECKERDT
WILLIAM P. EWALD
INVENTORS

BY Milton S. Sales
W. H. J. Kline
ATTORNEYS

SLIDE HOLDER

BACKGROUND OF THE INVENTION

1. Field of the Invention

This invention relates to a slide holder which may be releasably connected to a group of photographic slides or transparency mounts to facilitate handling of the slides in a group.

2. Description of the Prior Art

Slide projectors having means for supporting a plurality of slides and for transporting one slide at a time in an automatic or semi-automatic manner to and from a projection station are well known in the art. In many such projectors, the slides are loaded into a rotary magazine while in other projectors the slides are assembled in groups in face to face relationship. Coassigned U.S. Pat. No. 3,427,739 entitled COMBINED TOP LOAD STACK SLIDE ADAPTER AND PROJECTOR, which issued Feb. 18, 1969 to Herbert T. Robinson, shows an adapter for converting a projector of the former type to one of the latter type.

Slides are normally returned from a processor in boxes which may be used for storage after the slides are arranged in a desired sequence. When showing slides so stored by a projector having a magazine which accepts slides in groups of this type, it is advantageous to be able to transfer the slides directly from the storage box to the magazine, a function to which the slide holder of the present invention is particularly suited.

Other apparatus has been suggested in the prior art for transferring assembled slides from a storage container to a projector magazine. One such apparatus is shown in coassigned U.S. Pat. No. 2,698,765 entitled MAGAZINE CLIP FOR TRANSPARENCIES, which issued Jan. 4, 1955 to John H. Eagle. In the magazine clip disclosed in that patent, the slides are gripped between a pair of plates which are urged toward each other by a tension spring. To release the grip, a pair of members are mutually moved toward each other to stretch the spring and move the plates away from each other. Because the clip does not have a stable open condition, the plates will again grip the slides as soon as the members are released, the magazine clip must be removed from the slides during the projection operation. A slide clip which can remain with the slides during projection is shown in coassigned U.S. Pat. No. 3,552,846 entitled SLIDE STACK HANDLING SYSTEM FOR PROJECTORS, issued Jan. 5, 1971 to David E. Hansen. The gripping force of the Hansen clip is relieved by special structure on the projector, thus substantially preventing use of the clip except in conjunction with a projector designed specifically for that clip.

Canadian Pat. No. 763,785 entitled METHOD AND MEANS FOR SLIDE STORAGE AND HANDLING, which issued July 25, 1967 to Carl H. Wiklund, shows a slide clip for transferring slides from a storage tray to a projector magazine in which the slides may be gripped between a pair of arms which are spring urged apart. The arms may be moved toward each other against the spring force by a toggle-like lever to grasp the slides. In one position, the lever permits the spring force to release the slides, while in a second position, the lever pulls the two slide gripping arms towards one another to releasably retain the slides therebetween. While the operation of the Wiklund mechanism appears to be suitable for its intended purpose, the device is constructed with a large number of parts which must be assembled at what obviously would be greater cost than the manufacturing cost of the slide holder of the present invention. Further, it will become apparent that operation of the Wiklund slide clip requires more manual dexterity than the operation of the slide holder of the present invention.

SUMMARY OF THE INVENTION

It is an object of the present invention to provide an inexpensive, easily operable slide holder of simple construction for releasably gripping a plurality of slides to assist in the handling thereof.

It is another object of the present invention to provide a slide holder having slide retaining members movable between stable slide retaining positions and slide releasing positions by overcenter spring means.

It is yet another object of the present invention to provide such a slide holder with overcenter spring means effective to optimize (1) the amount of movement of the slide retaining members, (2) the required force to move the slide retaining members and (3) the durability of the slide holder, while at the same time providing for positive operation of the overcenter spring means (i.e. the spring means will have only two stable conditions and will not be stable in any intermediate positions.)

In accordance with the above objects, a preferred embodiment of the slide holder of the present invention is formed of a sheet of flexible material having a generally boxlike configuration with one open side, a generally rectangular upper plate and four depending legs each attached only to the upper plate. The upper plate has two parallel slots and the region between the slots is stretched to form a bowed area which acts as an overcenter spring having two stable conditions to, in one condition, urge two of the depending legs toward each other and, in the other condition, to urge those depending legs away from each other.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

The slide holder of the present invention provides a convenient means for handling a stack of slides and for moving the stack from a storage container to the slide magazine of a projector or similar device and then back to the storage container. When used in conjunction with a projector having a magazine as shown in U.S. Pat. No. 3,427,739, the holder may be left on the slides as they are being indexed through the magazine. The holder securely holds the slides while they are being moved between the storage container and the projector, is easily releasable to remove the slides therefrom and is readily actuated to re-engage the slides to move them back to the storage container after projection.

Figure 1:
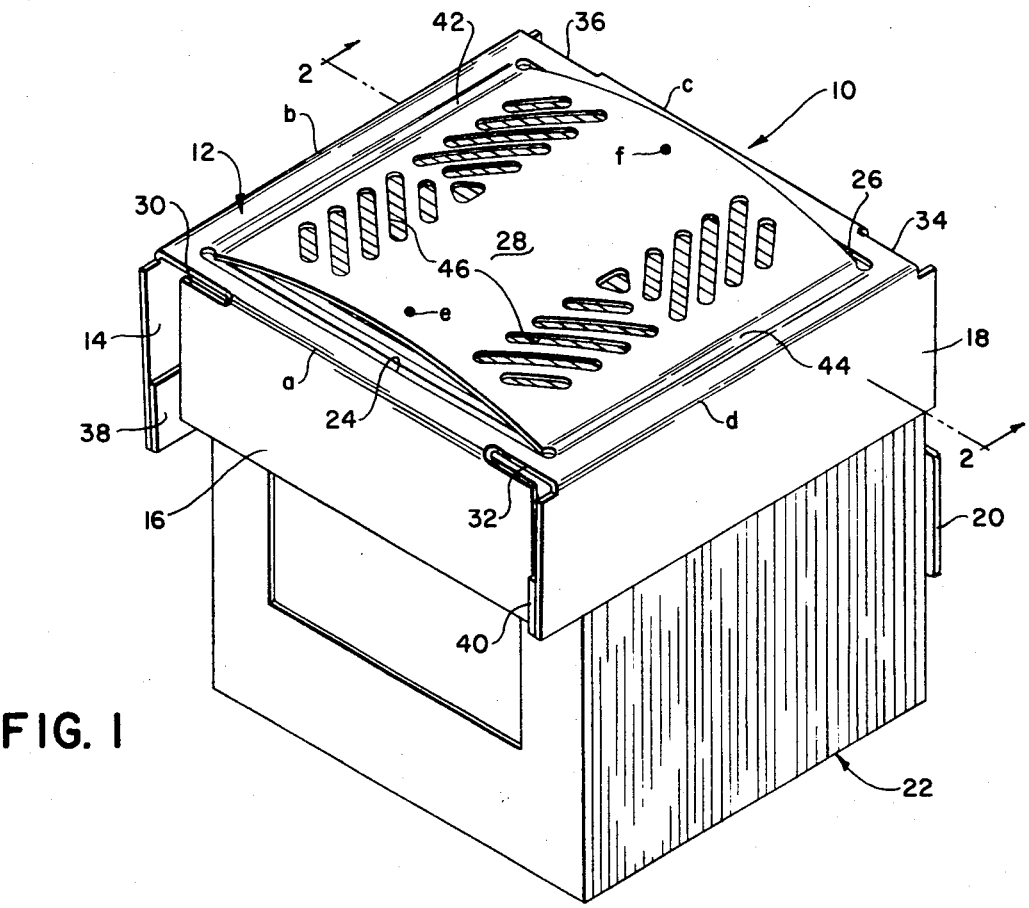
FIG. 1 is a perspective view of the slide holder of the present invention shown with a group of slides held therein.

Referring to FIG. 1, the slide holder 10 of the illustrated embodiment of the present invention is formed of a sheet of resilient, incompressible material such as steel. The sheet is bent along lines $a$, $b$, $c$ and $d$ to form a generally boxshaped configuration having one open side opposite a generally rectangular upper plate 12 and four side wall members 14, 16, 18 and 20 which depend from the edges of upper plate 12. While the dimension of upper plate 12 in a direction parallel to bends $a$ and $c$ is approximately determined by the width of the slides which make up a stack 22, the upper plate's dimension in a direction parallel to bends $b$ and $d$ can be chosen to correspond to the maximum number of slides to be positioned in the holder.

A pair of slots 24 and 26 have been provided in plate 12. The slots are parallel to bends $a$ and $c$ and have enlarged, rounded ends to prevent fatigue failure. Between the slots, a central portion 28 has been stretched so that, as can be seen best in FIG. 2, central portion 28 is bowed. Four other slots 30, 32, 34 and 36 have been provided along bends $a$ and $c$ so that upper plate 12 may be flexed in the regions close to bends $b$ and $d$ as will be explained hereinafter.

Figure 2:
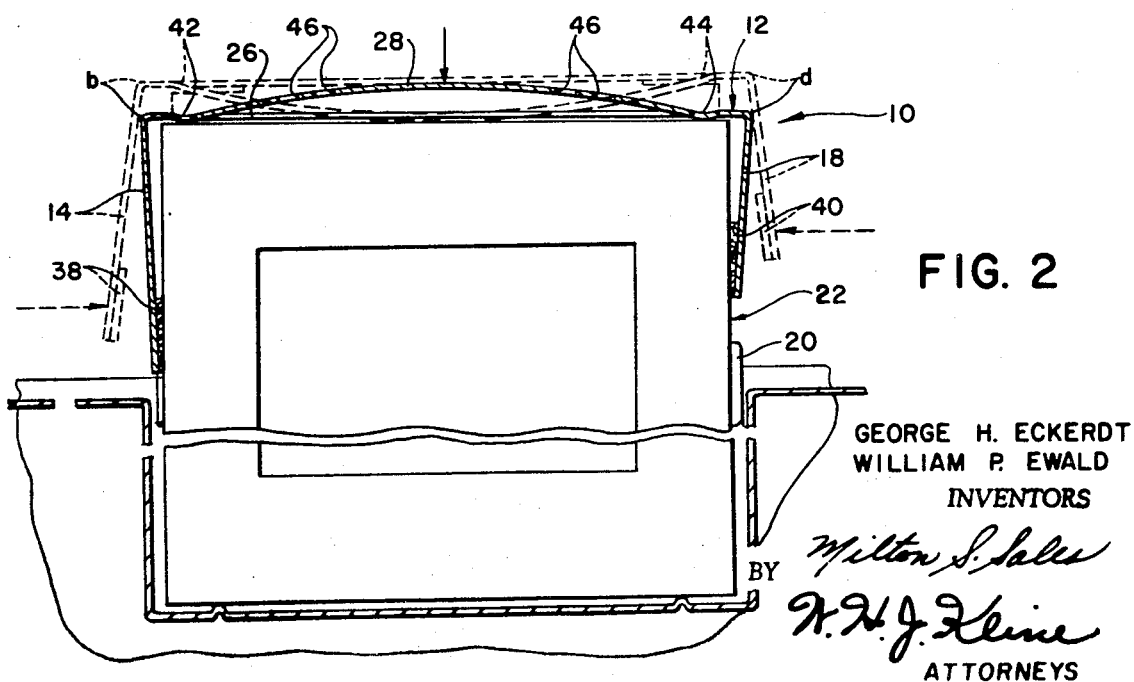
FIG. 2 is a sectional view taken along line 2—2 of FIG. 1 and further showing a portion of a slide projector and adapter for receiving slides held in the holder of the present invention.

Referring still to FIG. 2, bowed portion 28 acts as an overcenter spring having two stable conditions, one of which is shown in full line in that figure while the other is shown in phantom line. In the full line condition, i.e. where bowed member 28 is above the plane of upper plate 12 and the axis of curvature of the bow is below plate 12, the two edges of plate 12 near bends $b$ and $d$ are curved downwardly by the spring force of the bow (this is permitted by slots 30, 32, 34 and 36) so that slide gripping members 14 and 18 are moved to active positions clamping the group of slides therebetween, resilient pads 38 and 40 being provided to help grip the slides. When moved to the phantom line position below the plane of plate 12 so that the axis of curvature of the bow is above the plate, the bowed portion causes a slight bending of these edges of upper plate 12 so that slide gripping members 14 and 18 are moved outwardly to release the slide group. Central portion 28 is moved from its full line to its phantom line position by pressing downwardly on the central region of the bow, and is moved to its full line position from its phantom line position by pressing inwardly on gripping members 14 and 18.

To move the bowed member to its phantom line position, it must be pushed to a position below the plane of upper plate 12. If the top edges of the slides were in immediate contact with the bottom surface of plate 12, the slides would prevent such movement of the bowed member to a position below plate 12. Therefore, we have provided means for spacing the top edges of the slides from the upper plate. In the preferred embodiment, this spacing means is a depression 42 and 44 in the plate in the region of each of the junctions between the bowed member and the plate. However, other means suitable for this purpose will readily occur to those skilled in the art.

It is desirable to minimize the amount of force required to move bowed portion 28 between its raised, full line position, and its lowered, phantom line position while maximizing the amount of movement of slide gripping members 14 and 18. The material of the bowed member will ripple as the bowed member passes the plane of plate 12. Therefore, slots 46 have been provided in the bowed member to accommodate this ripple by weakening the material. The slots may be formed in many patterns, the pattern shown is preferred for the following reasons. If slot 46 were parallel, running in a direction from bend $b$ to bend $d$, the ripple would be accommodated along the length of the slots. By forming the slots on an angle, less force is required to move the bowed portion past plate 12 because the ripples can then cause a twisting of the material between the slots, less force being required to twist the metal than to ripple it. We have constructed experimental models of the slide holder wherein the slots were arranged in two parallel rows as shown, but with all of the slots in each row parallel to each other and converging with the slots of the other row toward bend $a$. It was found that more force was required to open the slide so constructed if the operator depressed the bowed portion at point $e$ than was required if point $f$ were depressed. Although the reason for this result has not been fully investigated, it is believed that more twisting of the metal between the slots results if the bow is depressed at a point approximately on a perpendicular to the direction of the slots. Therefore, in the preferred embodiment, the slots are arranged in opposed directions so that a force applied anywhere along the bowed portion will be on a perpendicular to at least some of the slots.

Figure 3:
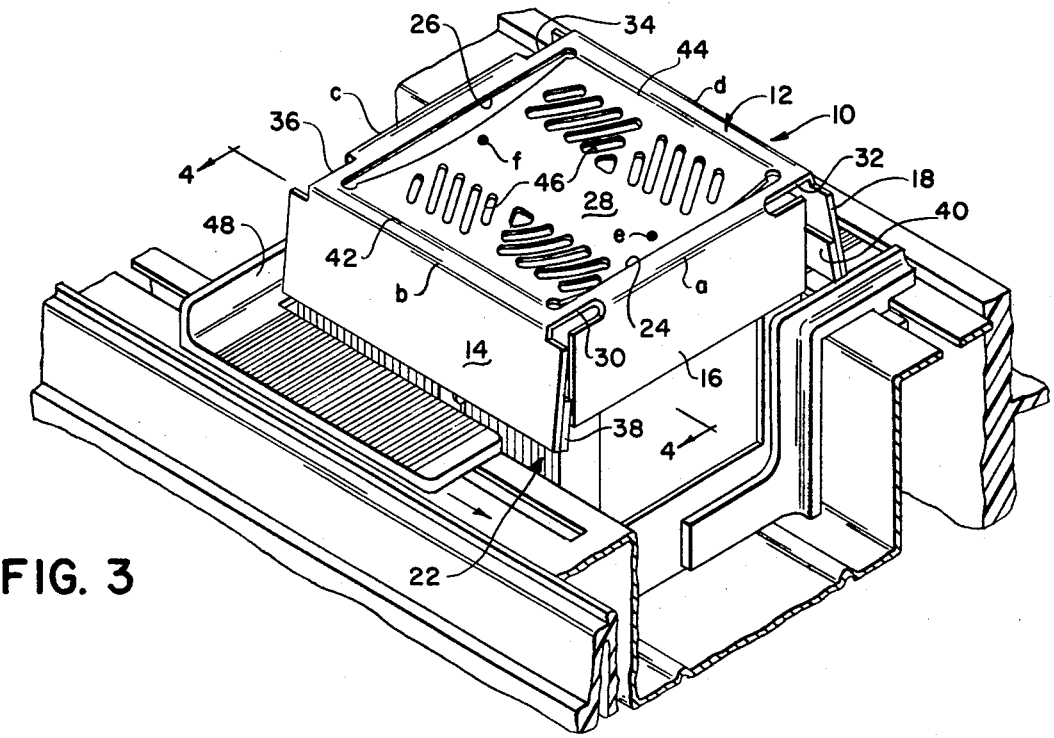
FIG. 3 is a perspective view of the slide projector, adapter and slide holder of FIG. 2.
Figure 4:
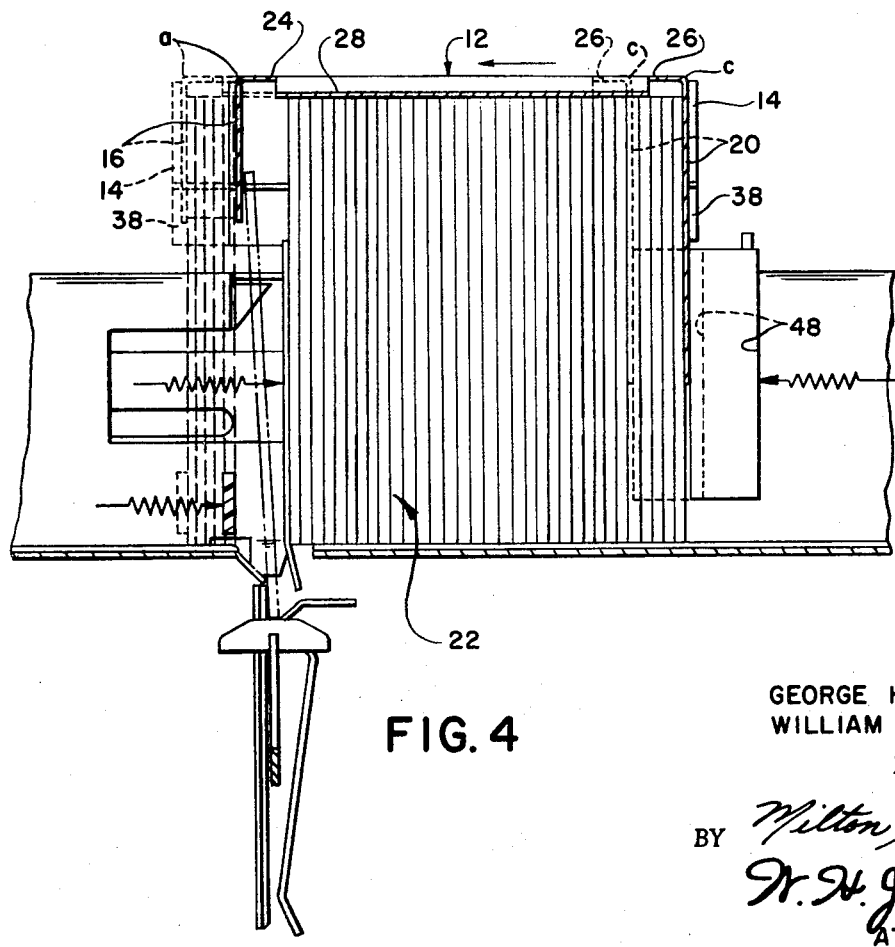
FIG. 4 is a section view taken along line 4—4 of FIG. 3.

FIGS. 3 and 4 show the illustrated embodiment of the slide holder on a group of slides which are positioned in a top load stack slide adapter on a slide projector having automatic slide changing capabilities. The projector and the adapter will not be described in detail herein, it being sufficient to point out that they are identical to the projector and the top load stack slide adapter which are shown in hereinbefore mentioned, coassigned U.S. Pat. No. 3,427,739.

The slide stack is removed from a storage container by placing the slide holder over the stack in its open condition. The holder is then closed by squeezing members 14 and 18 together, and the slide stack can then be transferred to the projector's magazine as a group. When the slides are placed in the magazine, top bowed portion 28 is depressed to move slide gripping members 14 and 18 to their inactive positions releasing the slides. Side wall member 20 is positioned between the last slide of the group and a slide pressure plate 48 of the adapter so that the slide holder will be moved by the pressure plate along with the group of slides. The slides are sequentially removed from the stack for projection as described in the Robinson patent and are returned to the stack. FIG. 4 shows the position of the slide holder and a stack of slides in full line before projection and further shows the slide holder and slides in phantom line after five slides have been returned to the stack and one slide is being returned. After the last slide has been projected and returned to the magazine, the operator may close the slide holder by manually moving slide gripping members 14 and 18 toward each other (toward their active positions) and thereby causing bowed member 28 to move to its raised position. The slides may now be removed from the adapter and returned to the storage container by lifting the slide holder.

The invention has been described in detail with particular reference to preferred embodiments thereof, but it will be understood that variations and modifications can be effected within the spirit and scope of the invention.

We claim:

1. A slide holder for receiving and releasably holding a stack of slides, said holder comprising:
    a pair of spaced slide gripping members adapted to be positioned on opposite sides of a stack of slides, at least one of said gripping members being movable (1) toward the other member to grip the slide stack and (2) away from the other member to release the slide stack; and
    overcenter spring means operatively connected to said one gripping member and having a first stable condition for urging said one member toward said other member and a second stable condition for urging said one member away from said other member.

2. A slide holder as defined in claim 1 further comprising means interconnecting said spring means and said one gripping member for (1) placing said spring means in its second stable condition when said one gripping member is moved toward said other member and (2) moving said one gripping member away from said other member when said spring means is placed in its first stable condition.

3. A slide holder for receiving and releasably holding a stack of slides, said slide holder comprising:
    a plate having two spaced, parallel edges;
    a first member connected to said plate along one of said edges and a second member connected to said plate along another of said edges, said first and second members (1) extending to one side of said plate in directions generally perpendicular to portions said plate near said one and other edges, respectively, and (2) being adapted to be positioned on opposite sides of a stack of slides; and
    overcenter spring means operatively connected to said plate and having (1) a first stable condition bending the portions of said plate near said edges toward said one side of said plate for causing said members to move toward each other to grip the stack of slides therebetween and (2) a second stable condition bending the portions of said plate near said edges away from said one side of said plate for causing said members to move away from each other to release the stack of slides therebetween.

4. A slide holder for receiving and releasably holding a stack of slides, said slide holder comprising:
    a flexible plate having (1) two spaced, parallel edges and (2) a region curved about an axis parallel to said edges and movable from one side to the other side of a plane defined by said edges so as to flex said plate; and
    a first member extending generally perpendicularly from at least one side of said plate at one of said edges and a second member extending generally perpendicularly from at least said one side of said plate at the other of said edges, said members being adapted to be positioned on opposite sides of a stack of slides located adjacent said one side of said plate, whereby said members are moved (1) toward each other to grip the slides when the axis of curvature of said region is on said one side of said plate and (2) away from each other to release the slides when the axis of curvature of said region is on the other side of said plate.

5. A slide holder for receiving and releasably holding a stack of slides, said slide holder comprising a sheet of resilient material, said sheet:
    being bent along two parallel, spaced lines to form a generally U-shaped configuration in cross-section along a plane perpendicular to said lines;
    including a generally rectangular plate having two opposed edges coinciding with said bends to form the base of the U-shaped configuration, said plate (1) defining a pair of spaced slots each extending in a direction perpendicular to said opposed edges and (2) including a region between said slots which is curved about an axis parallel to said edges, whereby said region will form a bow movable from one side to the other side of a plane defined by said edges so as to flex said plate;
    including first and second side wall members depending generally perpendicularly to said plate from one and the other of said opposed edges, respectively, to form the legs of the U-shaped configuration, whereby said side wall members will be moved toward each other to grip a stack of slides therebetween by the flexure of said plate when said bow is moved to one side of said plate and will be moved away from each other by the flexure of said plate to release the stack of slides therebetween when said bow is moved to the other side of said plate.

6. A slide holder as defined in claim 5 further comprising means on said plate for spacing said plate from the stack of slides received between said side wall members.

7. A slide holder as defined in claim 6 wherein said spacing means comprises at least one raised portion on the surface of said plate from which said side wall members depend.

8. A slide holder as defined in claim 6 wherein said spacing means comprises a pair of raised portions on the surface of said plate from which said side wall members depend, one of said raised portions extending between a first end of each of said slots and the other of said raised portions extending between a second end of each of said slots.

9. A slide holder as defined in claim 5 further comprising means defining a plurality of slots in said region of said sheet to permit the sheet to ripple in said region as the bow formed thereby is moved from one side to the other side of the plane defined by said edges.

10. A slide holder as defined in claim 9 wherein said slots in said region are elongated and extend at an angle to said edges.

11. A slide holder as defined in claim 10 wherein said angle is substantially different than ninety degrees.

12. A slide holder as defined in claim 11 wherein approximately half of said slots in said region extend in a direction approximately at right angles to the direction in which the other slots extend.

* * * * *